Patented Oct. 28, 1930

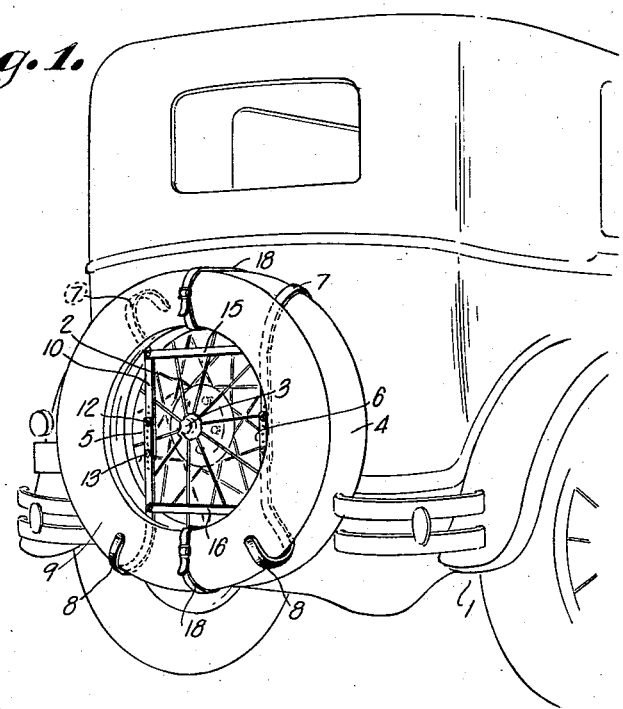
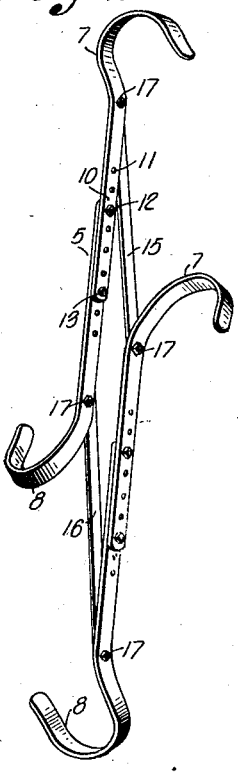
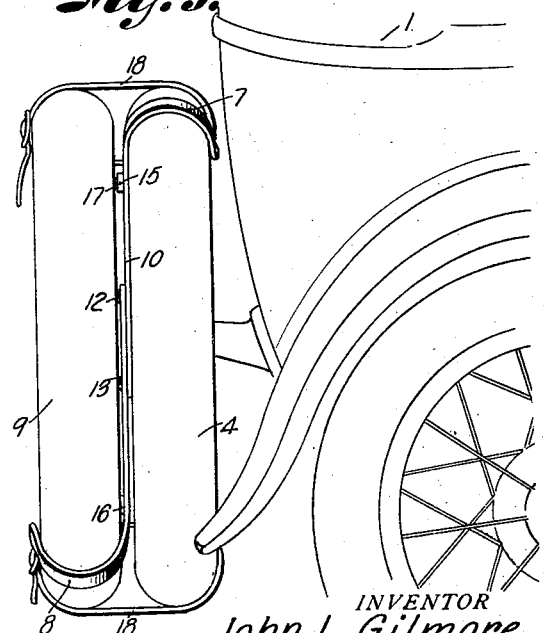

1,779,877

UNITED STATES PATENT OFFICE

JOHN L. GILMORE, OF KANSAS CITY, MISSOURI

SPARE-TIRE CARRIER

Application filed October 17, 1929. Serial No. 400,295.

My invention relates to auxiliary tire supports and more particularly to a collapsible support adapted to be mounted on a wheel supported tire.

Spare wire wheels having hubs projecting beyond the planes of the rims and carrying tires are frequently carried on automobiles. Ordinary hangers for auxiliary tires cannot conveniently be mounted on the spare wheel because the bar of the tire support passing the axis of the wheel is interfered with by the hub thereof.

A parctiular object of my invention therefore is to provide a collapsible auxiliary tire support adapted for mounting on a wire wheel supported tire to receive and support an auxiliary tire.

In accomplishing these and other objects of the invention, I have provided improved details of structure, the preferred forms of which are illustrated in the accompanying drawings, wherein:

Fig. 1 is a perspective view of the rear portion of an automobile, a spare wire wheel mounted thereon and my improved auxiliary tire support mounted on the spare wheel for supporting a spare tire.

Fig. 2 is an enlarged perspective view of the tire support.

Fig. 3 is a side elevation of the rear end of the automobile and the wire wheel and spare tire supported thereon.

Referring in detail to the drawings:

1 designates generally an automobile and 2 a wire wheel having a projecting hub 3 and an inflated tire 4, the wheel being mounted on the rear end of the automobile.

My device comprises a pair of members 5 and 6 having inwardly extending hooks 7 on upper ends to engage the tire of the wire wheel and oppositely outwardly extending hooks 8 on their other ends to receive a spare tire 9. Each member preferably comprises a pair of arms or hook members having bar-like shanks 10 provided with openings 11 adapted to register to receive bolts 12 and 13 whereby the shank of one arm may overlie the other arm for aligning the shanks and may be adjusted therealong for varying the length of the member, the bolts extending through registering openings in the shanks to receive nuts for securing the arms together.

The two members are pivotally connected by links 15 and 16 having opposite ends mounted on bolts 17 in the shanks adjacent the hooks, thus pivotally connecting the similar ends of the arms whereby the device may be spread for installing the hooks 7 on the wheel tire.

The members are thus held in spaced relation to provide an aperture through which the hub of the wire wheel and the projecting portions of the wire spokes may extend.

The pivotally connected members may thus be extended to form a rectangular frame for mounting on the wire wheels, the upper inwardly projecting hooks engaging the wheel supported tire at spaced points on each side of the vertical diameter of the wheel and the outwardly projecting lower hooks being held in spaced relation in a similar manner to receive the auxiliary tire.

The hooks 7 and 8 are preferably bent outwardly laterally with respect to the axes of the arms to locate the inner surfaces of the hooks at greater distances from the extended vertical diameter of the supported tire than would be the case if the arms and hooks were strictly aligned and thus provide more widely spaced upper hooks for the wheel supported tire and spaced lower hooks for the auxiliary tire. Straps 18 are provided for securing the auxiliary tire to the wheel.

In using the invention, the lengths of the arms may be adjusted to provide for centering the skeleton frame of the device on the wire wheel and the upper hooks mounted over the wheel supported tire, with the members spread laterally to their maximum extent and the connecting links lying horizontally.

The auxiliary tire may then be mounted on the lower hooks and the straps may be employed to secure the auxiliary tire to the wire wheel. Each member thus supports one portion of the tire and the arms are retained in spaced relation by the pivoted links which serve to anchor one member to the opposite member.

The device may be removed from the wire wheel and collapsed for storage.

The device may be mounted on a rim-supported tire to form a substantial support for an auxiliary rim-supported tire, whether or not the rims are permanently secured to wheels.

It is apparent that when an auxiliary spare tire is mounted on a wire wheel, the hub of the auxiliary wheel is accommodated in the opening of the frame, and when the spare tire is also mounted on a spare wheel, the frame accommodates the hubs of both the spare wheel and the auxiliary spare wheel.

What I claim and desire to secure by Letters Patent is:

1. An auxiliary tire support comprising pairs of hook members having aligned shanks secured together and links mounted on the shanks to form a rectangular frame.

2. An auxiliary tire support comprising pairs of hook members having aligned shanks secured together and links pivoted to the shanks to form a rectangular frame.

3. An auxiliary tire support comprising two pairs of arms, each pair having inwardly extending hooks on one end and outwardly extending hooks on the other end, the shanks of the arms of each pair overlying each other and being provided with registrable openings to receive bolts for attaching one arm to the other, and links pivotally connected to similar arms of the pairs adjacent the hooks thereof to form a frame.

4. An auxiliary tire support comprising two pairs of arms having inwardly extending hooks on one end and outwardly extending hooks on the other, the shanks of the arms of each pair overlying each other, adjustable means for connecting the arms, and links pivotally connected to similar arms adjacent the hooks thereof whereby the support may be spread.

5. In a device of the character described for supporting an auxiliary hubbed wheel provided with a tire from an automobile supported tire, a pair of arms having hooks on one end to engage the automobile supported tire and hooks on the other end to receive the auxiliary wheel, and links pivotally connecting said arms to form a collapsible frame adapted to accommodate the hub of said wheel.

6. An auxiliary tire support, comprising pairs of hook members having aligned shanks secured together, and members connecting the shanks to form a rectangular frame.

7. An auxiliary tire support comprising a pair of laterally spaced hooks adapted to rest over the upper portion of the tread of a spare tire, a second pair of laterally spaced hooks arranged below the respective members of the first pair of hooks and adapted to receive the lower part of a second spare tire arranged substantially parallel with the first tire, laterally spaced longitudinally adjustable means for connecting the respective members of the upper pair with the respective members of the lower pair of hooks, and vertically spaced transverse members for connecting said last described members forming a substantially rectangular frame with an open central portion for receiving the wheel hub.

In testimony whereof I affix my signature.

JOHN L. GILMORE.